United States Patent [19]

Peetz et al.

[11] Patent Number: 4,579,180

[45] Date of Patent: Apr. 1, 1986

[54] DRILLING BIT

[75] Inventors: Wolfgang Peetz, Blitzenreute; Siegried Klaissle, Schlier; Bernhard Moser, Altshausen; August Hausmann, RV-Overzell, all of Fed. Rep. of Germany

[73] Assignee: Hawera Probst GmbH and Co., Ravensburg, Fed. Rep. of Germany

[21] Appl. No.: 610,754

[22] Filed: May 16, 1984

[30] Foreign Application Priority Data

May 18, 1983 [DE] Fed. Rep. of Germany ....... 3317989

[51] Int. Cl.[4] .............................................. E21B 10/44
[52] U.S. Cl. ..................................... 175/394; 175/395
[58] Field of Search ................... 175/394, 395, 19, 20, 175/310, 323, 102; 52/157; 299/87; 408/230

[56] References Cited

U.S. PATENT DOCUMENTS

| 1,166,153 | 12/1915 | Ridley et al. | 175/394 |
| 4,016,944 | 4/1977 | Wohfeld | 175/394 X |
| 4,286,677 | 9/1981 | Guex | 175/395 |

Primary Examiner—Stephen J. Novosad
Assistant Examiner—Thuy M. Bui
Attorney, Agent, or Firm—Becker & Becker, Inc.

[57] ABSTRACT

A drilling bit having two helical withdrawal grooves which extend from the drilling head in the direction toward the insertion or chucking end. The withdrawal grooves have least slope in the vicinity of the drilling head. In the other regions, the withdrawal grooves have a different slope. As a result, no cross-sectional jumps disposed at uniform intervals are provided on the drilling bit, so that transverse oscillations cannot be reinforced by partially constantly or continuously reflected pulses. A considerable reduction in noise is achieved. Furthermore, the central portion of the drilling bit, which is critical during drilling, receives great rigidity.

12 Claims, 8 Drawing Figures

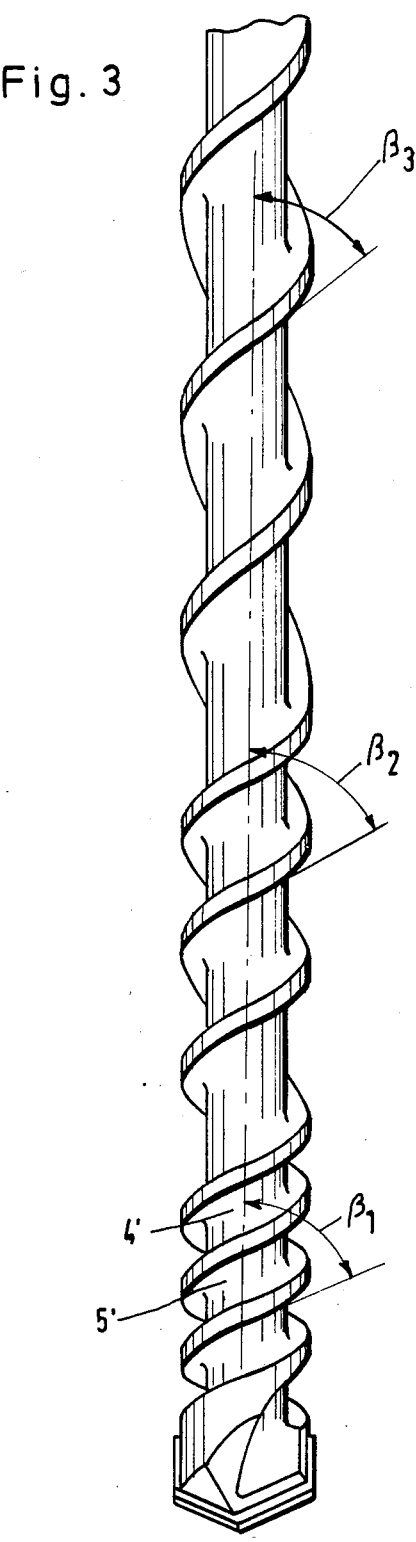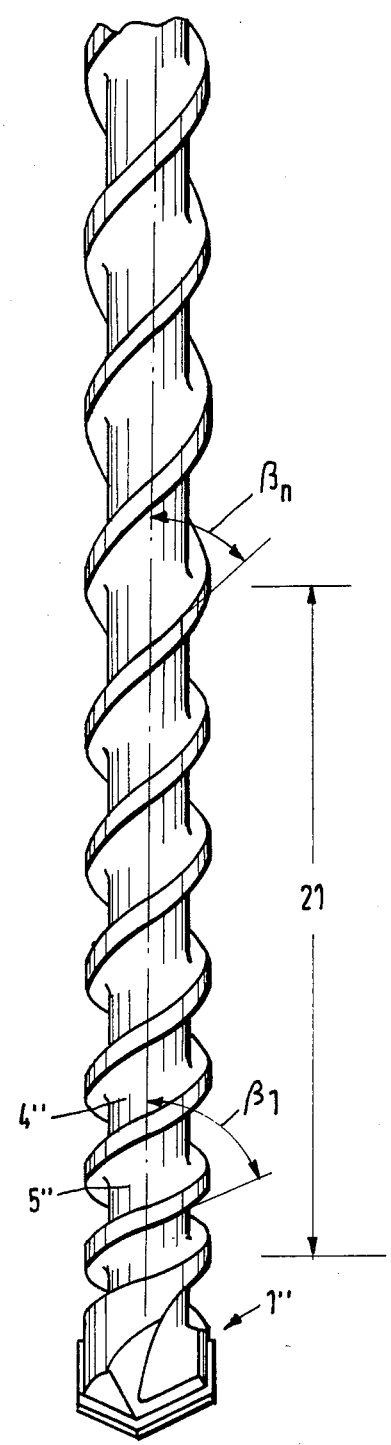

DRILLING BIT

BACKGROUND OF THE INVENTION

1. Field of the Invention

The present invention relates to a boring tool or drilling bit, preferably for use in a hammer drill. The drilling bit has a drilling head, a shaft portion connected thereto, an insertion or chucking part for connection with a driving unit, and at least one, preferably two, helical withdrawal flutes or grooves which extend from the drilling head.

2. Description of the Prior Art

With heretofore known drilling bits of this type, the withdrawal groove, which is provided for removal of the cuttings and dust produced during drilling, has a constant slope over its entire length. When used in a hammer drill, axial impacts or strokes overlap the rotational movements of the drilling bit and act upon the chucking end of the bit. Longitudinal oscillations are produced in the drilling bit as a result of these stroke pulses. The pulse wave front resulting from the continuous pulse stress is reflected in part at cross-sectional jumps of the drilling bit. These jumps are produced by the withdrawal groove, in the vicinity of which the drilling bit has a reduced cross section. Since the withdrawal groove of the heretofore known drilling bit has a constant slope, the cross-sectional jumps are disposed at uniform intervals along the bit. As a result, the pulse wave front is continuously partially reflected at each cross-sectional jump. However, this continuity affects the transverse oscillations, which share responsibility for noise, which are finally also stimulated by the stroke pulses, and which can be reinforced by the partially reflected pulses. As a result of the cross-sectional jumps being disposed at uniform intervals, resonance oscillations can even occur, due which the drilling bit is stressed very severely, and can even become damaged. The transverse oscillations, which are reinforced by the partially reflected pulses, result in the development of considerable noise. Furthermore, the drilling power of the bit is reduced due to the partially continuous reflection of the longitudinal oscillations.

It is an object of the present invention to design a drilling bit of the aforementioned general type in such a way that the energy of the stroke pulse is distributed in the drilling bit in such a way that the bit obtains a greater chip-producing or material-removing energy, while the noise or sound energy is reduced.

BRIEF DESCRIPTION OF THE DRAWINGS

This object, and other objects and advantages of the present invention, will appear more clearly from the following specification in conjunction with the accompanying drawings, in which:

FIGS. 3-6 show four further embodiments of inventive drilling bits; and

SUMMARY OF THE INVENTION

The drilling bit of the present invention is characterized primarily in that the withdrawal groove or grooves have their least slope in the vicinity of the drilling head. With the inventive drilling bit, the withdrawal groove no longer has a constant slope over its entire length. Rather, in the vicinity of the drilling head, the bit withdrawal groove has its least slope, while in the remaining regions, the bit withdrawal groove has a different slope or slopes. As a result, there are no longer produced on the drilling bit any cross-sectional jumps which are disposed at uniform intervals, since in conformity with the varying slope of the withdrawal groove, the cross-sectional weaknesses or reinforcements are provided at unequal intervals along the drilling bit. Due to the irregularity disposed cross-sectional jumps, the transverse oscillations are no longer reinforced by the partially constantly or continuously reflected pulses, resulting in a considerable reduction of noise. Due to the inventive design, the transverse oscillations cannot become resonant, so that damage to the drilling bit as a result of such resonance oscillations is precluded. Since the partially reflected pulses at the cross-sectional jumps no longer reinforce the transverse oscillations, not only is a considerable reduction of noise achieved, but a significantly greater drilling power is also achieved which is up to 65% better than that of heretofore known drilling bits.

Pursuant to specific features of the present invention, the slope of the withdrawal groove can increase starting from the drilling head, and can even increase up to the chucking end. The slope of the withdrawal groove can increase uniformly from the drilling head in the direction toward the chucking end, or can increase in stages. The slope of the withdrawal groove can also initially increase starting from the drilling head, and then can remain constant up to the chucking end. As the slope of the withdrawal groove increases, the axial width thereof also can increase.

The withdrawal groove may have different cross-sectional contours over its length. For example, in the vicinity of the drilling head, the withdrawal groove may have a cross section which is at least nearly rectangular. The radial depths of the withdrawal groove may decrease, preferably uniformly, starting from the drilling head and proceeding in the direction toward the chucking end.

DESCRIPTION OF PREFERRED EMBODIMENTS

Figure 1:
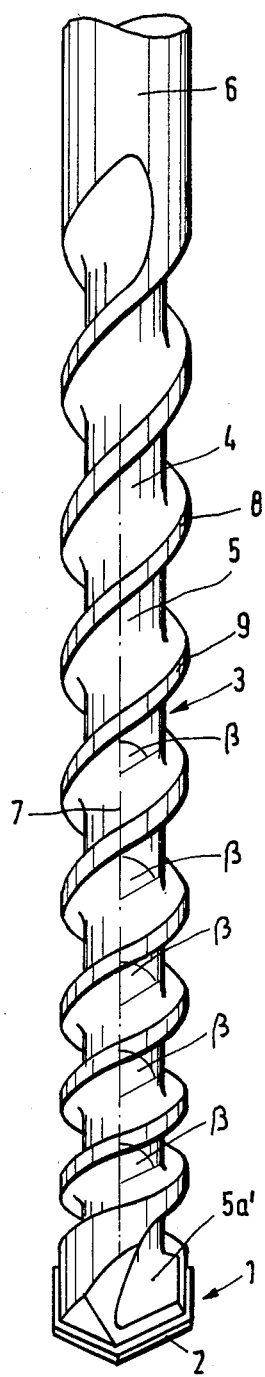
FIG. 1 shows one embodiment of the inventive drilling bit.

Referring now to the drawings in detail, the inventive boring tool or drilling bit preferably is provided for use in hammer drills, and serves for drilling in concrete, rock, and related materials. It has a boring or drilling head 1, which is provided with a cutting element 2. It preferably comprises a hard alloy or metal, but also can comprise other suitable materials. A plurality of cutting elements can also be provided on the drilling head. Finally, the drilling head 1 also can be made completely out of a hard alloy or metal or other material without cutting elements. A shank portion 3 is connected to the drilling head 1. In the illustrated embodiment, two helical withdrawal flutes or grooves 4 and 5 are provided in the shank portion 3; these grooves extend from the drilling head 1 up to an insertion or chucking end 6. The cuttings or dust which result during drilling are transported in the grooves 4 and 5 from the drilling head 1 toward the chucking end 6. The drilling bit is held in a driving unit via the chucking end 6, and is rotatably driven by the driving unit. When a hammer drill is used as the driving unit, axial strokes overlap the rotational movements of the drilling bit. Connected to the withdrawal grooves 4, 5 are feed grooves 5a'. only one of which is shown in FIG. 1. The feed grooves extend relatively steeply from the cutting region, and merge into the withdrawal grooves, which in the illustrated embodiment extend at a flatter incline.

The withdrawal grooves 4, 5 have their least slope or inclination at the drilling head 1; in other words, the angle of inclination $\beta$ of the withdrawal grooves is relatively large (FIG. 1). The angle of inclination $\beta$ is measured relative to the axis 7 of the drilling bit. The slope of the withdrawal grooves 4, 5 increases starting from the drilling head 1; this is shown by the angles of inclination $\beta$ in FIG. 1 as they decrease in the direction toward the chucking end 6. Since the withdrawal grooves 4, 5 have least slope thereof in the region of the drilling head 1, the inventive bit, during drilling, obtains a significantly better support on the wall of the drilled holes as compared to the situation encountered with conventional drilling bits. The raised portions or lands 8 and 9, which delimit the withdrawal grooves, also extend in a helical manner. Due to the flat slope of the withdrawal grooves, the distance 10 between the lands 8 and 9 is relatively small in the region of the drilling head in the axial direction of the drilling bit; consequently, in this region, the drilling bit can be optimally supported against the wall of the drilled hole. The lands 8, 9 have concentric ridge surfaces 11, 12, which are disposed on a common imaginary cylindrical surface. Due to the slight inclination of the withdrawal grooves 4, 5 at the drilling head 1, the ridge surfaces 11, 12, when viewed in the axial direction, are disposed at a correspondingly slight distance from one another; consequently, a support of the drilling bit over a large surface area is achieved in the critical region of the drilling head 1. Due to the small axial spacing of the ridge surfaces 11, 12 from one another, the axial alignment of the drilled hole is similarly improved. Furthermore, due to the small slope, the drilling head can be made very small, so that the cuttings or dust produced during drilling are received as quickly as possible by the withdrawal grooves 4, 5 and are withdrawn from the drilling head.

Since the slope or angle of inclination of the withdrawal grooves 4, 5 increases starting from the drilling head 1, as the distance from the drilling head increases, the cuttings are more quickly transported in the axial direction of the drilling bit. This assures that no clogging occurs in the region of the drilling head in the drilled hole. Due to the increasing slope of the withdrawal grooves 4, 5, a relatively large inclination is preferably achieved in the middle region of the shank 3, as well as in the region of the chucking end 6; this relatively large inclination has an advantageous effect on the bending resistance of the drilling bit. As a result, a middle portion of the drilling bit, which is critical during drilling, is reinforced particularly against bending by the large slope of the withdrawal grooves 4, 5, so that the danger of breaking during drilling is considerably reduced, especially when deep holes are being drilled, is considerably reduced.

The ridge surfaces 11, 12 have a nearly constant width over the length of the lands 8, 9. The result of this, in combination with the increasing slope of the withdrawal grooves 4, 5, is that the axial width 13 of the withdrawal grooves 4, 5 is increased in the direction toward the chucking end 6. As a result, without having to increase the depth of the withdrawal grooves 4, 5, the groove volume is increased, so that correspondingly greater quantities of cuttings or dust can be reliably conveyed away from the drilling head 1. Finally, due to the increasing slope of the withdrawal grooves 4, 5, and the increasing axial distance between adjacent lands 8, 9, the friction contact surfaces of the drilling bit on the wall of the drilled hole are reduced; these surfaces are, of course, formed by the ridge surfaces 11, 12 of the lands 8, 9. The wall friction in the drilled hole is therefore slight, so that the driving unit is not severely loaded and stressed.

Thus, without reducing the drilling power, there is made possible utilization of driving units which have less power. The inventive drilling bit also assures that on the one hand in the region of the drilling head, due to the slight slope of the withdrawal grooves 4, 5, a reliable support on the wall of the drilled hole as well as a rapid withdrawal of the resulting cuttings is achieved; the inventive drilling bit also assures that on the other hand the friction contact surfaces of the drilling bit on the wall of the drilled hole are reduced and the groove volume is increased in the direction toward the chucking end 6.

Figure 2:
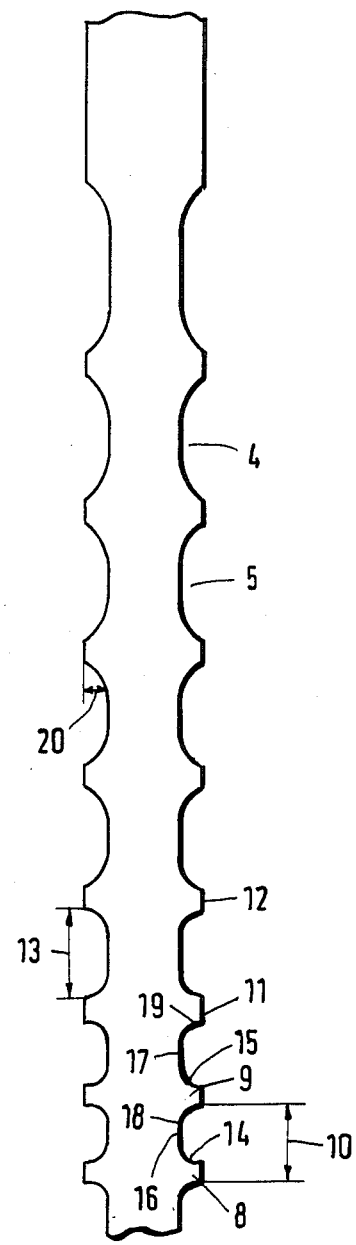
FIG. 2 is a sectional view through the drilling bit of FIG. 1.

In the specific embodiment illustrated in FIGS. 1 and 2, the angle of inclination of the withdrawal grooves 4, 5 increases up to the chucking end 6. As a result, the volume of the withdrawal grooves 4, 5 increases over the entire length of the drilling bit, and the wall friction from the ridge surfaces 11, 12 of the lands 8, 9 is optimally reduced. In order that the described effect occurs uniformly over the entire length of the drilling bit, the inclination of the withdrawal grooves 4, 5 preferably increases uniformly in the direction toward the chucking end 6. This also results in advantages for manufacturing reasons.

Figure 5:
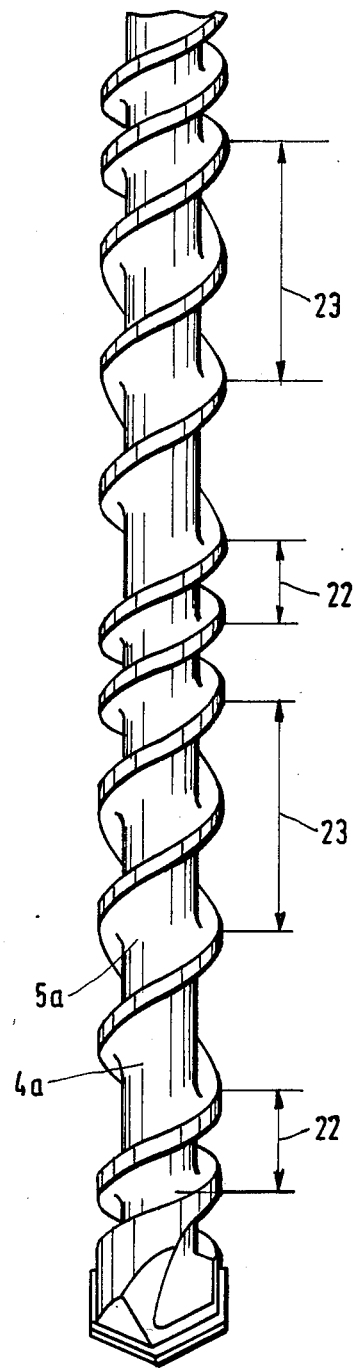
Figure 6:
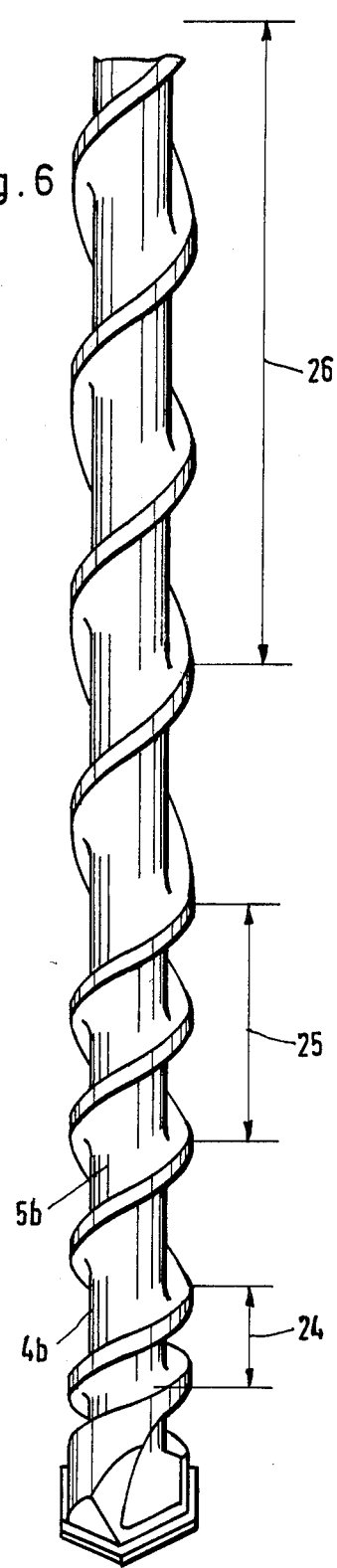

However, there also is made possible to have the slope of the withdrawal grooves increase by sections from the drilling head 1 in the direction toward the chucking end 6 (FIG. 3). In this case, the withdrawal grooves 4', 5' can have a constant slope, for example for two times around the shaft 3, before the slope increases again. In this manner, the increase of the slope of the withdrawal grooves 4, 5 can be effected, for example, after each two times around; thus, increase of the slope of withdrawal grooves, within the two times around the slope, is always kept constant. As shown in FIG. 3, after each two times around or the withdrawal grooves 4', 5', the angle of inclination $\beta_1$, $\beta_2$, $\beta_3$, decreases, while these angles of inclination remain constant within these times around the slope. As a result, the drilling bit can be adapted to various applications. Thus, for example, the slope of the withdrawal grooves 4a, 5a (FIG. 5) first can remain constant over two times around along spacing or distance 22, then for three times around along spacing or distance 23, and then again for two times around along spacing or distance 22. The increase of the inclination in stages also can increase uniformly in the direction toward the chucking end 6. For example, as shown in FIG. 6, the slope of the withdrawal grooves 4b, 5b can be constant over respective two, three, four, and five times around 24-26, and can increase from one stage to the other. The increase of the slope of the withdrawal grooves thus can be varied. In all situations, however, the smallest slope of the withdrawal grooves is provided in the region of the drilling head 1 in order to there achieve the previously described effect.

As shown in FIG. 2, due to the withdrawal grooves 4, 5, the drilling bit is provided with jumps in cross-sectional area. When the axial strokes or impulses are exerted upon the drilling bit during drilling, longitudinal oscillations occur in the bit due to this stroke pulse. The pulse wave front of the longitudinal oscillations is partially reflected at these jumps in cross-sectional area. Due to the stroke pulse, transverse oscillations also are induced in the drilling bit; however, these transverse oscillations are not reinforced by the pulses which are partially reflected at the jumps in cross-sectional area. This is achieved by the fact that the jumps in cross-sectional area are not provided at uniform distances along the drilling bit. Over the length of the drilling bit, the lands 8, 9 have different spacings in the direction toward the chucking end 6; in the illustrated embodiment, this distance periodically increases. This reliably prevents the pulses which are partially reflected at the jumps in cross-sectional area formed by the lands 8, 9, from reinforcing the transverse oscillations. As a result, a considerable reduction in noise is achieved. Formation of resonance between the transverse oscillations and the partially reflected pulses is also reliably prevented. Due to the low wall friction, and the rapid transport of cuttings from the drilling head 1, a very high drilling capacity also is achieved at the same time.

Over their length, the withdrawal grooves 4, 5 preferably are provided with different cross-sectional contours (FIG. 2), so that the withdrawal grooves can be designed, with regard to the ability to receive the cuttings or dust, in conformity with the requirements at any given time. In the vicinity of the drilling head 1, the withdrawal grooves 4, 5 essentially have a square or rectangular cross-section (FIG. 2). Thus, despite the slight slope of the withdrawal grooves 4, 5 in the vicinity of the drilling head, a large receiving capacity for the cuttings is provided. Due to the nearly rectangular cross-sectional contour, the withdrawal grooves 4, 5, at the respective ridge surfaces 11, 12 of the lands 8, 9 are provided with carrying surfaces 14, 15 which are connected at right angles and which, with a relatively large radius of curvature, merge into the concentric bases 16, 17 of the grooves 4, 5. On the relatively wide carrying surfaces 14, 15, the cuttings produced can be reliably conveyed into the withdrawal grooves in the direction toward the chucking end 6. In an arcuate curve, the base 16, 17 merges into a side wall 18, 19 which is disposed across from the carrying surface 14, 15 and extends to the ridge surfaces 11, 12.

In the same manner in which the withdrawal grooves 4, 5 become axially wider, i.e. extend more steeply, the carrying surfaces 14, 15 become smaller until in the middle portion of the drilling bit they are connected in a curved manner to the ridge surfaces 11, 12 of the lands 8, 9. Since the ability to receive cuttings in these regions is already large due to the increasing axial width 13 of the withdrawal grooves, a rectangular or nearly rectangular cross-sectional contour of the grooves is no longer necessary. However, it is of course possible to maintain the nearly rectangular cross-sectional contour of the withdrawal grooves over entire length thereof. In any case, the cuttings delivered into the large receiving space in the region of the drilling head 1 is reliably conveyed further by the appropriately wide regions of the withdrawal grooves 4, 5. Since the nearly rectangular cross-sectional contour is provided in the narrow helical region of the withdrawal grooves 4, 5 close to the drilling head 1, the cuttings, even if they are produced in large quantities, are conveyed out of the drilled hole into the withdrawal grooves 4, 5 without build-up over the entire drilling depth, and without binding the drilling bit. A relatively large quantity of cuttings is disposed on the carrying surfaces 14, 15 and conveyed along the withdrawal grooves.

Figure 7:
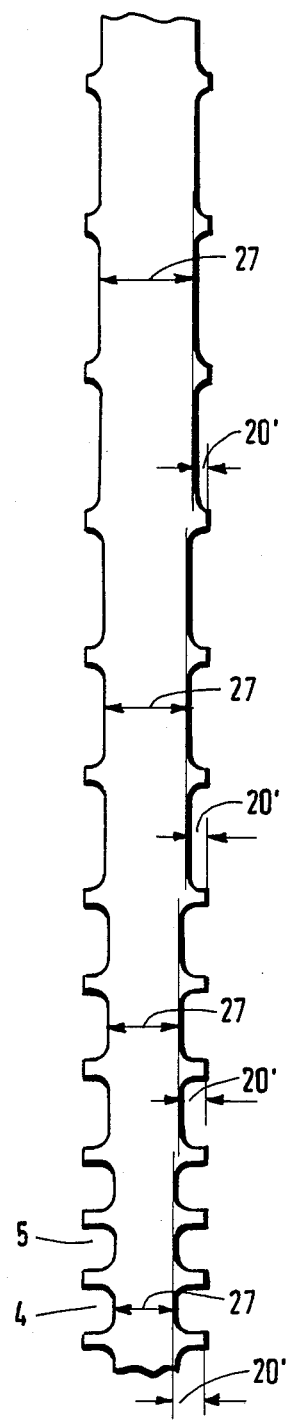
FIGS. 7 and 8 are sectional views of two further embodiments of inventive drilling bits.
Figure 8:
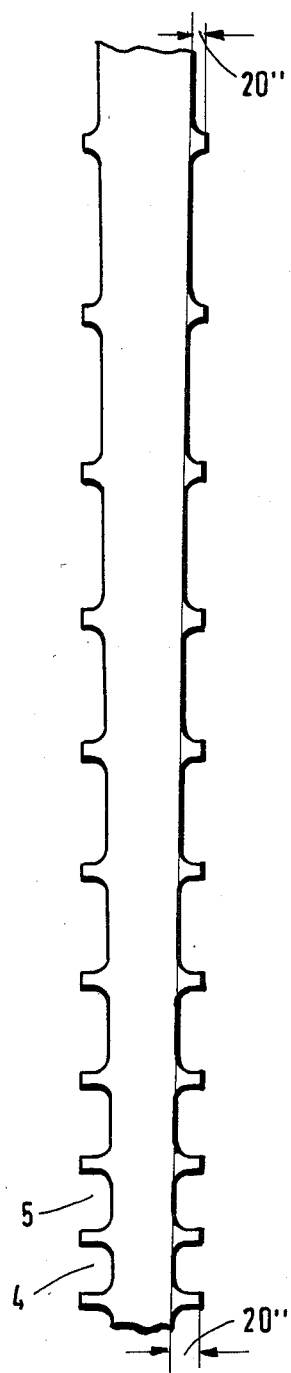

Since the axial width 13 of the withdrawal grooves 4, 5 increases in the direction toward the chucking end 6 as a result of the increasing slope, the depth 20' of the withdrawal grooves 4, 5 can decrease in the direction toward the chucking end 6 (FIG. 7), with the diameter 27 of the core of the shank portion 3 increasing in stages. The depth 20" of the withdrawal grooves preferably decreases in the same manner as the angle of inclination of these grooves increases (FIG. 8). As a result, without impairing the withdrawal of the drilling cuttings, the strength of the drilling bit is increased. Preferably, the depth 20' of the withdrawal grooves 4, 5 decreases uniformly, so that an approximately uniform increase in cross-sectional area of the drilling bit is achieved in the vicinity of the withdrawal grooves.

In the illustrated embodiment, the slope of the withdrawal grooves 4, 5 increases from the drilling head 1 to the chucking end 6. However, the drilling bit also can be designed in such a way that the slope of the withdrawal grooves first increases starting from the drilling head, and preferably increases uniformly, and then remains constant starting at a distance from the drilling head all the way to the insertion or chucking end. Such an embodiment is shown in FIG. 4. Starting from the drilling head 1", the slope increases, preferably uniformly, over an axial length in a region 21; i.e., the angle of inclination in this region decreases from an angle $\beta_1$ at the drilling head to an angle $\beta_n$ at the end of the region 21. Thereafter, the slope of the withdrawal grooves 4", 5" remains constant up to the insertion or chucking end. Within the region 21, the slope of the withdrawal grooves 4", 5" also can increase either non-uniformly or in stages.

With all of the embodiments of the inventive drilling bit, the energy of the stroke pulse is distributed in such a manner that the drilling bit receives a higher chip-producing energy upon reduction of the noise or sound energy. As a result, a considerable reduction of noise is achieved at a 65% better drilling power in comparison to conventional drilling bits. Instead of having the two withdrawal grooves previously described, the drilling bit also can have just one withdrawal groove. A further important advantage obtained with all of the inventive embodiments is that particularly the central portion of the drilling bit, which is especially critical during drilling, has a greater rigidity or bending strength since the withdrawal grooves in this region have a greater slope than in the region of the drilling head. Due to the great slope of the withdrawal grooves, the cross-sectional weakness of the drilling bit is distributed by the withdrawal grooves over a greater axial length, as a result of which the advantageous greater rigidity is achieved.

The angle of inclination of the withdrawal grooves in the region of the drilling head is preferably between about 65° and 75°. The smallest angle of inclination, and hence the greatest slope, of the withdrawal grooves is no less than about 30°.

The present invention is, of course, in no way restricted to the specific disclosure of the specification and drawings, but also encompasses any modifications within the scope of the appended claims.

What we claim is:

1. A drilling bit having a length along which longitudinal oscillations may be produced as a result of stroke pulses with energy applicable during drilling operation therewith, comprising;
  a longitudinally extending shank portion having two ends;
  a drilling head provided at one of said ends of said shank portion; and
  a chucking part provided at the other of said ends of said shank portion for effecting connection of said drilling bit to a driving unit; at least one withdrawal groove being provided on said bit, and extending helically from said drilling head; said at least one withdrawal groove having a non-uniform slope varying and different from any constant inclination of underside of drill-dust spirals as viewed along the length of said drilling bit, with the least slope being provided in the vicinity of said drilling head so that energy of the stroke pulse is distributed in such a manner that the drilling bit receives significantly greater drilling power up to 65% better than previously possible with an increased chip-producing energy accompanied by reduction of noise or sound energy while at the same time without constant inclination assuring that pulse-wave-front resonance oscillations anrd fluctuations are precluded from occuring to avoid damaging of the drill bit.

2. A drilling bit according to claim 1, which includes two withdrawal grooves of non-uniform slope, each having their least slope in the vicinity of said drilling head.

3. A drilling bit according to claim 1, in which the slope of said at least one withdrawal groove increases starting from said drilling head.

4. A drilling bit according to claim 3, in which the slope of said at least one withdrawal groove increases up to said chucking part.

5. A drilling bit according to claim 4, in which the slope of said at least one withdrawal groove increases uniformly.

6. A drilling bit according to claim 4, in which the slope of said at least one withdrawal groove increases in stages.

7. A drilling bit according to claim 3, in which the slope of said at least one withdrawal groove initially increases starting from said drilling head to a certain point, and remains constant from the point to said chucking part.

8. A drilling bit according to claim 3, in which the axial width of said at least one withdrawal groove, i.e. that dimension of the latter substantially parallel to a central longitudinal axis of said bit, increases along with increasing slope of said at least one withdrawal groove.

9. A drilling bit according to claim 3, in which the cross-sectional contour of said at least one withdrawal groove varies as viewed along the length of said bit.

10. A drilling bit according to claim 9, in which, in the vicinity of said drilling head, said cross-sectional contour is at least approximately rectangular.

11. A drilling bit according to claim 3, in which the radial depth of said at least one withdrawal groove, i.e. that dimension of the latter substantially perpendicular to a central longitudinal axis of said bit, decreases from said drilling head in the direction of said chucking part.

12. A drilling bit according to claim 11, in which said radial depth decreases uniformly.

* * * * *